Patented Sept. 11, 1934

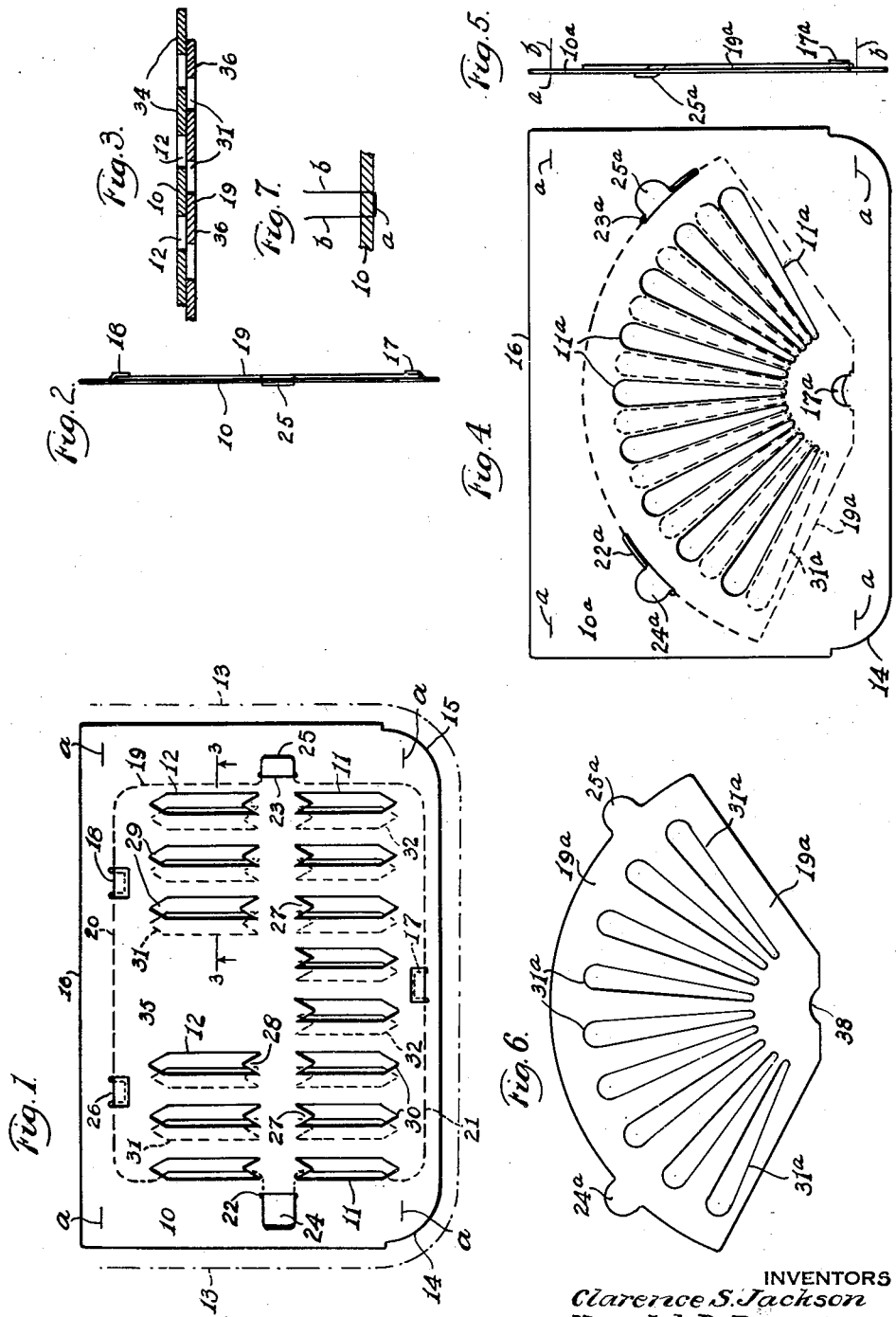

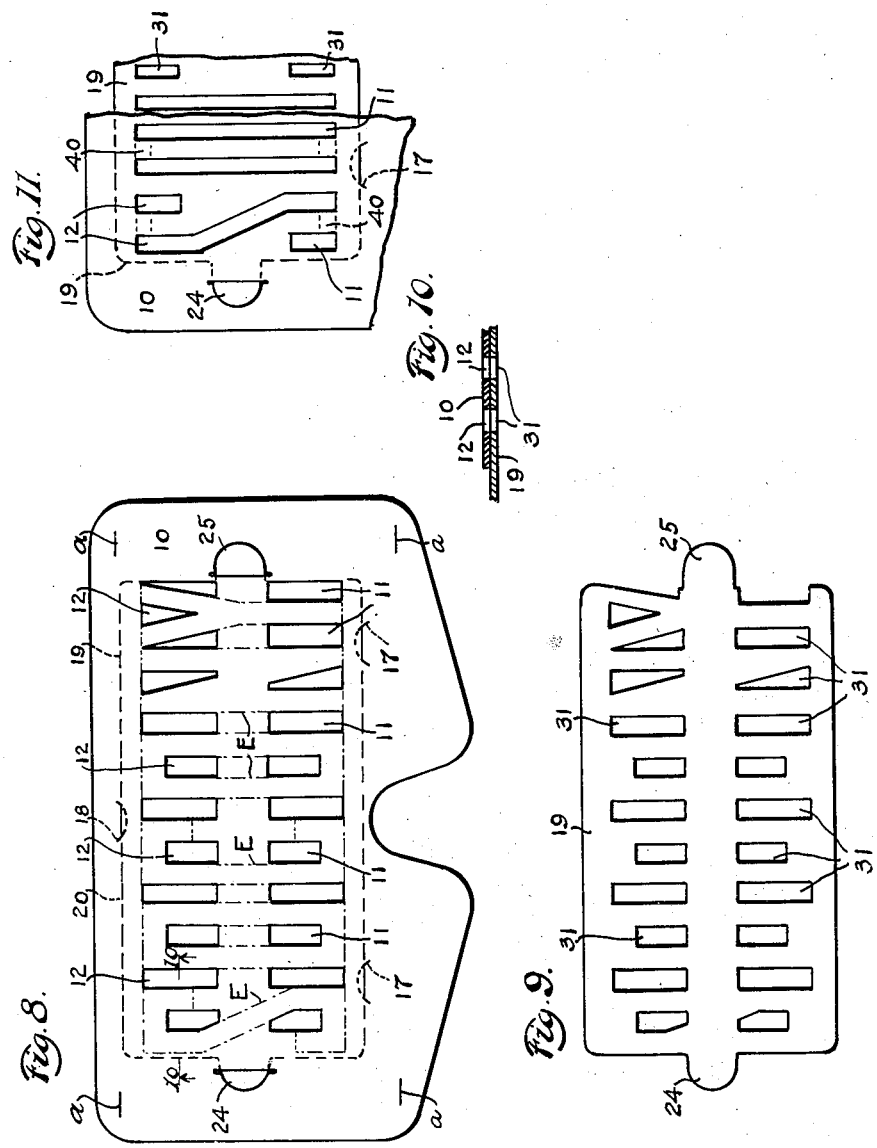

1,973,078

UNITED STATES PATENT OFFICE 1,973,078

SHUTTER FOR AUTOMOBILE RADIATORS

Clarence S. Jackson, New York, and Harold D. Penney, Pelham, N. Y., assignors to Robert Gair Company, Inc., New York, N. Y., a corporation of Delaware Application October 25, 1933, Serial No. 695,197

3 Claims. (Cl. 189—61)

This invention relates to radiator shutters and is herein disclosed in connection for attachment for an automobile radiator.

This application relates to the matter of our former application, Serial No. 585,508.

One of the objects of the invention is the provision of a structure in which the constituent elements are so arranged structurally and functionally as to assure novel or improved results and is made of comparatively inexpensive material such as card or paper board, which is easy to manufacture and upon which may be printed advertising matter, as desired.

Connected with the foregoing, and also to secure one of its joint objects, the invention is directed to an adjustable structure which, attached to the front of a radiator, is effective to control air movement for conserving heat in the radiator and engine during cold weather.

The main features of the present device lie in that, by the use of a cardboard of suitable thickness it may be easily stamped out with suitable tabs for operative interlocking of the parts thus making an economical easily assembled structure, upon which oil, gasoline grease and tire manufacturers may imprint advertisements and give the device free to the user.

Simple wire means for attaching the device to the radiator of an automobile are provided upon the device.

The attachment includes only one relatively movable section, and the other nonmovable attaching member bearing advertisements thereon, and protecting the rear or movable member.

With the above indicated objects in view, the particular embodiments of the invention now selected for disclosure are herein clearly described, and fully illustrated in the accompanying drawings, in which:

Fig. 1 is a plan view of an automobile radiator cover or attachment.

Fig. 2 is an end elevational view thereof.

Fig. 3 is a horizontal section taken on the line 3—3 of Fig. 1.

Fig. 4 illustrates a modification of structure.

Fig. 5 is an end elevational view of the device shown in Fig. 4.

Fig. 6 is a plan view of a section of the device shown in Fig. 4.

Fig. 7 is a fragmentary sectional view of a portion of the front member showing one of the radiator attaching wires thereon.

Fig. 8 is a front assembled view of another modified form of our device showing it in the form of a stencil cut-out.

Fig. 9 is a front view of the shutter portion used with the device shown in Fig. 8.

Fig. 10 is a sectional view shown on 10—10 Fig. 8, looking in the direction of the arrows.

Fig. 11 is a fragmentary front view of a form of stencil cut out reversely cut to that shown in Fig. 8.

Similar characters of reference are applied to corresponding parts throughout the several views.

Represented in the present instance as being of cardboard, pasteboard or fibrous material, our air regulating shutter includes a front slotted sheet 10 and a movable rear slotted sheet 19, through which the slotted openings 11, 12 provide a passage for air, the device being placed against the front face of an engine radiator 13, as of an automobile, so that air passing through the perforated or open central slotted part of the said shutter may be regulated. The front sheet 10 is provided with four, or more of required U shaped attaching wires, $a, a, a, a$, Fig. 4, which are forced through the front face of the member 10, leaving two rearwardly extending prongs $b$—$b$, which are pushed through the openings in the radiator honey-comb, not shown, and then the ends of prongs $b$—$b$ are twisted together at the rear of the radiator core to operatively hold the device to the front thereof.

This front sheet 10, which may have ornamental boundary edges, as at 14, 15, opposite a top straight edge 16, is provided with a cut-out lower base tab 17 and similar top tabs 18—26, Fig. 1, beneath which a slotted rear sheet 19 is slidably supported by its opposed edges 20, 21 between said tabs. In the front sheet are opposed slots 22, 23, and as the movable rear sheet has extending therefrom manually movable tabs 24, 25, which are disposed in said slots, and extend outwardly therefrom, the last mentioned tabs rest on the front surface of the front sheet 10 and serve as manipulable portions for sliding the rear sheet back and forth on the front sheet, in the guideways formed by the rearwardly located tabs 17—18—26 on the front sheet 10, Figs. 1 and 2.

As here shown the respective openings 11, 12 have at their inner ends projecting or tapered portions 27, 28 of the material, while their outer ends have also tapering outlines 29, 30, but other ornamental boundary edges may also be provided for said openings.

Corresponding in outline with the openings 11, 12 of the front sheet 10 are openings 31, 32, on the rear sheet 19 so that on sliding the sheet 19, as by its tabs 24, 25, the openings in the respective sheets may either be aligned to allow of a maximum passage of air, or moved completely out of alignment to complete closure. As seen in Figs. 1 and 3 the sheets 10, 19 are arranged to provide only partial air regulation to the radiator.

The front face of the outer sheet 10 may have any display, advertising or identifying matter on the space 35 thereon which may be left large enough for this purpose.

A modification of our shutter is shown in Figs. 4–6 wherein the formation of the openings 11a and 31a differs from those already described, being radially arranged about a point of convergence located near the pivotal tab 17a. Thus, while the structural elements of this modification are equal as to the number of parts and function this particular structure permits of rocking radially to control the air while the structure of Figs. 1 to 3 are slidably movable in a straight line. In this case the front sheet 10a is provided with radially disposed tab slots 22a, 23a, through which manipulable tabs 24a, 25a of the rear sheet 19a extend, and on a tab 17a of the first sheet the second sheet pivots during its rocking manipulation to open or close the air slots there being a notch 38 in the last mentioned sheet.

Features that are common to both devices shown herein are as follows: They are both made of two pieces of flexible material, both have coacting tabs and slots which are easily interengageable with one another for operative assembly, without eyelets staples or like mechanical fastenings.

Each structure has a front shutter element which is mountable to the front of a radiator and is therefore non-moving, and this fixed element in turn operatively supports a rear, movable shutter element and shields the movable element against damage, and maintains it in any operative set position.

A further common feature is that the tab slots 22—23 of Fig. 1, and the tab slots 22a—23a Fig. 4 are so dimensioned and coordinated to the manipulable tabs 24—25 and 24a—25a carried by the respective rear members that the slots act as limiting stops for the movement of the rear shutter members in either full open or full closed position. There is no tendency of either movable rear shutter to move after setting as it is frictionally held between the shielding front member and the radiator face and this friction is enhanced by the engine fan suction and wind pressure when the vehicle is moving.

Inasmuch as many other changes may be made in the constructions at present disclosed, and many apparently different embodiments of the invention could be made without departing from the scope thereof, it is intended that the matter contained in the foregoing description or shown in the accompanying drawings shall be taken as illustrative and not in a limiting sense.

In order to show a further extension of the foregoing described idea in its commercial embodiment, such as where specifically applied to some given commercial house for giving away to customers, as shown in Figs. 8 to 11, said modifications of those designs are shown in Figs. 1 to 6 inclusive.

By referring to Fig. 8 the stencil cut out forms coacting air spaces between the front member 10 and the rear member 19, the said cut outs being so arranged that the upper cut out 12 and the lower cut out 11 leave letter forming connections therebetween so that in the present instance, and as illustrated in Fig. 1, the letters formed by this arrangement of upper and lower cut outs form the letters SOCONY in block type and this letter formation may be accentuated by leaving the entire front face of the front blank 10 of one color, say white, and the letters above mentioned outlined in ink, as indicated by the dash and dot lines E on several of the letters. Thereby the name of the company may be left as to be quickly readable.

In this construction the letters are left solid on the front blank 10 and the spaces and other cut out portions of the letter are formed by complete cut outs to accentuate the letter formation.

As in Fig. 9 the corresponding closure member to that shown in Fig. 1 is also cut so that the spaces will correspond to the open spaces 11 and 12 of Fig. 8 so that when as is shown in Fig. 8 the back closure member 19 is in open position the spaces are in the position shown in Fig. 10 thereby forming air passages through the front member 10 and the rear member 19.

By moving the rear plate member by manipulation of the tabs 24 or 25 as described for Fig. 1, the spaces 11, 12 and 31 are moved in such a manner as to substantially close off all of the apertures between both said members, thereby blocking the spaces 11 and 12 on the front member 10, thereby closing the shutter. The back member 19 may be so provided in its structure that it may be moved to the right of Fig. 8 or to the left in order to close and cut out the spaces 11 and 12. The back piece 19 may be left the same color as the unlettered front face of 10, Fig. 8, whereby upon closure of the member 19 the letters formed on the front face of 8 will continue to be legible.

A modification of this form of cut out is shown in Fig. 11 whereby the letters may be partially stenciled or cut out on the front face 10 with the interconnecting portions of said letters, as indicated in one or two places as at 40—40, Fig. 11, imprinted in color thereby completing the formation of the letters whereas the back plate 19 only partly complete will be cut in a similar manner so that side sliding movement of the back plate 19 will cut off or open by the spaces 11 and 12 as in Fig. 11.

What we claim is:

1. A shutter for an engine radiator comprising a front sheet of material having therein air openings, tabs extending rearwardly from said sheet, said sheet having also therein tab slots, a rear sheet movably mounted under said tabs and having air openings aligned with said first air openings to facilitate air movement therethrough, said second sheet including tab portions marginal to its openings for closing said first openings to arrest the air movement, said tabs extending from said rear sheet through said tab slots whereby to move said rear sheet, said slots acting as stops to limit the action of said second sheet at the end of either full open or full closed shutter position.

2. The combination with an automobile radiator, of a shutter comprising a front sheet of paper board having openings therein, said sheet having opposed slots, a rear sheet of reduced area adjustably mounted on said front sheet and having openings cooperating with the first openings to control air movement, manipulating tabs extending from said rear sheet through said slots whereby to adjust said rear sheet for varying the size of said openings, and wires passing through said front sheet and having bendable terminals attaching said shutter to the radiator.

3. A shutter for an automobile radiator comprising a front sheet of paper board having openings therein, said sheet having opposed slots, a rear sheet of reduced area adjustably carried by said front sheet and having openings for cooperating with the first mentioned openings, tabs extending through said slots from said rear sheet to support the latter, wires passing through said front sheet and extending rearwardly therefrom to attach the shutter to the radiator, and means comprising said tabs, which latter are manipulable, for adjusting said rear sheet to vary the size of said openings for controlling movement of air to said radiator.

CLARENCE S. JACKSON.
HAROLD D. PENNEY.